United States Patent
Hayakawa et al.

(10) Patent No.: US 6,465,063 B1
(45) Date of Patent: Oct. 15, 2002

(54) HEAT-SHRINKABLE POLYESTER FILMS

(75) Inventors: Satoshi Hayakawa; Maki Sato; Shoichi Gyobu, all of Otsu; Norimi Tabota, Inuyama; Katsuya Ito, Otsu, all of (JP)

(73) Assignee: Toyo Boseki Kabushiki Kaisha (JP)

( * ) Notice: Subject to any disclaimer, the term of this patent is extended or adjusted under 35 U.S.C. 154(b) by 0 days.

(21) Appl. No.: 09/967,963

(22) Filed: Oct. 2, 2001

(51) Int. Cl.[7] .......................... B23B 27/00; B23B 27/36
(52) U.S. Cl. ..................... 428/35.1; 428/34.9; 428/480; 528/295.3; 528/302; 528/308
(58) Field of Search ................ 428/34.1, 34.9, 428/35.1, 480; 528/295.3, 302, 308

(56) References Cited

U.S. PATENT DOCUMENTS 5,932,685 A * 8/1999 Mori et al. ................. 428/347
6,342,281 B2 * 1/2002 Hayakawa et al. ......... 428/327

FOREIGN PATENT DOCUMENTS

| EP | 0 826 482 A2 | * | 3/1998 |
| EP | 1 090 739 A2 | * | 4/2001 |
| EP | 1 120 352 A2 | | 8/2001 |
| JP | 05 170944 | | 7/1993 |
| JP | 05 208447 | | 8/1993 |
| JP | 05 305667 | | 11/1993 |
| JP | 07 048441 | | 2/1995 |

* cited by examiner

Primary Examiner—Vivian Chen
(74) Attorney, Agent, or Firm—Kenyon & Kenyon

(57) ABSTRACT

Heat-shrinkable polyester films, each having a heat shrinkability of 40% or higher in the main shrinkage direction of the film after treatment in hot water at 80° C. for 10 seconds, the change of heat shrinkability in the main shrinkage direction of the film after treatment in hot water at 55–75° C. for 10 seconds before and after the film is left under an atmosphere at 40° C. for 160 hours being 15% or lower, exhibit beautiful shrinkage finish in appearance involving only rare occurrence of shrinkage spots, wrinkles, strains, folding and other defects during shrinkage in the step of shrinking with hot air, and in particular, exhibit a quite small lowering in shrinkage finish after a lapse of time for storage and have low spontaneous shrinkability; therefore, these films are suitably used for applications such as labels and cap seals.

5 Claims, 1 Drawing Sheet

HEAT-SHRINKABLE POLYESTER FILMS

FILED OF INVENTION

The present invention relates to heat-shrinkable polyester films, and more particularly, it relates to heat-shrinkable polyester films having excellent low temperature shrinkability, suitable for applications such as labels and cap seals, which cause only rare occurrence of shrinkage spots, wrinkles, strains, folding and other defects after heat shrinkage of the film in the step of shrinking with hot air, which exhibit a quite small lowering in shrinkage finish after a lapse of time for storage, and further which have low spontaneous shrinkability.

BACKGROUND OF THE INVENTION

In the past, heat-shrinkable films have widely been used for various applications, such as shrink-wrap films, shrinkable labels and cap seals, by making use of their property of causing shrinkage by heating. In particular, stretched films made of vinyl chloride resins, polystyrene resins or polyester resins have been used for labels on various vessels such as polyethylene terephthalate (PET) vessels, polyethylene vessels, and glass vessels.

However, vinyl chloride resins have serious problems including evolution of harmful gasses such as hydrogen chloride gas in their incineration. In addition, heat-shrinkable films made of vinyl chloride resins are used for shrinkable labels on PET or other vessels, the labels should be separated from the vessels and discarded in the recycling of vessels. Further, in the applications such as full labels, which require shrinkable labels to have high heat shrinkability depending on the shapes of vessels, heat-shrinkable films made of vinyl chloride resins have serious problems that they cannot be used because of their low heat shrinkability leading to the failure of shrinkage.

In contrast, films of polystyrene resins or polyester resins cause no evolution of harmful substances such as hydrogen chloride gas in their incineration, and therefore, these films have been expected to take the place of vinyl chloride rein films as shrinkable labels on vessels.

However, polystyrene resin films, although they exhibit good shrinkage finish in appearance after shrunk, have poor solvent resistance, so that they require the use of special ink in their printing. They also have serious problems in their disposal, e.g., they require incineration at high temperatures, in which case they may cause evolution of black smoke and bad smell in large quantities. They further have serious problems that they cannot be used in the applications which require shrinkable films to have high heat shrinkability because of their failure of shrinkage similarly to vinyl chloride resin films. For materials capable of solving these problems, polyester resin films have extremely been expected to serve, and their use has been increasing.

Even the above conventional heat-shrinkable polyester films, however, have not yet been quite satisfactory in their heat-shrinkage characteristics. In particular, they have serious problems that shrinkage spots, wrinkles, strains and folding easily occur during shrinkage in the step of shrinking with hot air; and when used to cover vessels such as PET bottles, polyethylene bottles and glass bottles, and then shrunk, letters or patterns previously printed on the films before shrinkage are distorted; and adhesion of the films to the vessels is insufficient. In addition, when stored at room temperature for a long period of time, they cause a remarkable lowering in shrinkability at low temperatures, so that shrinkage rapidly occurs making it further easy to form defects such as shrinkage spots, wrinkles and folding. The shrinkability at low temperatures raised too much to solve these problems leads to another serious problem that spontaneous shrinkability becomes higher.

SUMMARY OF THE INVENTION

Under the actual circumstances of the prior art, the present inventors have extensively studied heat-shrinkable polyester films, and as a result, they have reached the present invention. That is, to attain the above purpose, the heat-shrinkable polyester films of the present invention are characterized in that the heat shrinkability in the main shrinkage direction of the film after treatment in hot water at 80° C. for 10 seconds is 40% or higher and the change of heat shrinkability in the main shrinkage direction of the film after treatment in hot water at 55–75° C. for 10 seconds before and after the film is left under an atmosphere at 40° C. for 160 hours is 15% or lower.

BRIEF DESCRIPTION OF THE DRAWING

In FIG. 1, the point of intersection and the intersection temperature for the values of tan $\delta$ are defined.

DETAILED DESCRIPTION OF THE INVENTION

Figure 1:
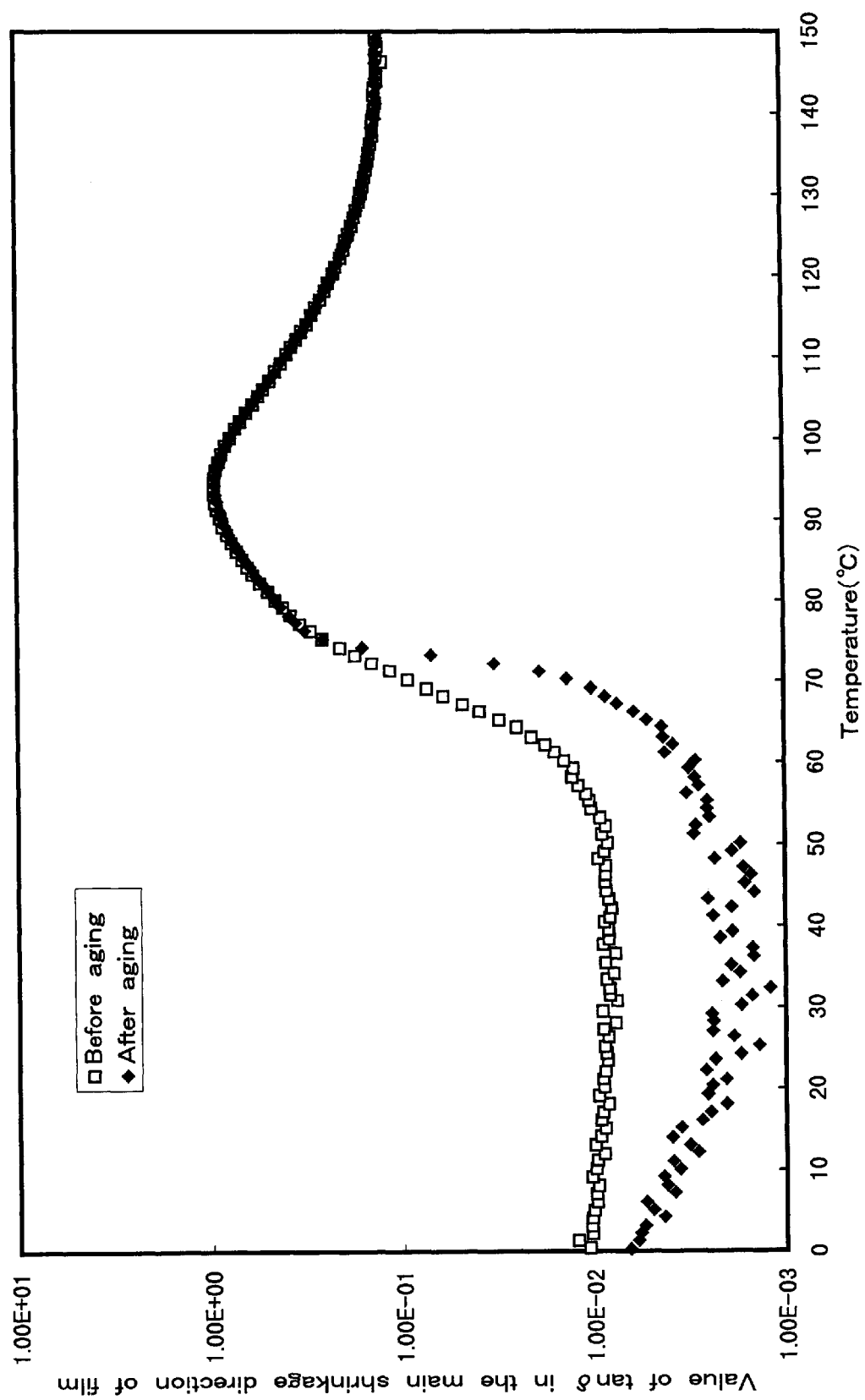
FIG. 1 is a plot of the values of tan $\delta$ for dynamic viscoelasticity in the main shrinkage direction of a film before and after the film is left under an atmosphere at 40° C. for 160 hours.

The heat-shrinkable polyester films of the present invention should have a heat-shrinkability of 40% or higher in the main shrinkage direction of the film after treatment in hot water at 80° C. for 10 seconds. When the heat shrinkability is lower than 40%, the films exhibit, when used for applications such as full labels or cap seals, which require film labels to have high shrinkability depending on the shapes of vessels, poor shrinkage finish because of their failure of shrinkage. To obtain more stable shrinkage finish in appearance, the films may preferably have a heat shrinkability of 50% or higher, more preferably 60% or higher, in the main shrinkage direction of the film after treatment in hot water at 80° C. for 10 seconds. The heat shrinkability in a direction perpendicular to the main shrinkage direction of the film is not particularly limited, but higher values of such heat shrinkability lead to the occurrence of longitudinal sinking or distortion of patterns by shrinkage in the height direction of labels. Therefore, the films may preferably have a heat shrinkability in a perpendicular to the main shrinkage direction of the film after treatment in hot water at 80° C. for 10 seconds.

In the present invention, the films should further exhibit a change of heat shrinkability of only 15% or lower in the main shrinkage direction of the film after treatment in hot water at 55–75° C. for 10 seconds before and after left under an atmosphere at 40° C. for 160 hours. When the change of heat shrinkability is higher than 15%, the films in the long-term storage at room temperature have remarkably deteriorated in their shrinkability at low temperatures in the step of heat shrinking. As a result, the long-term stored films start to shrink immediately at a certain temperature in the step of heat shrinking, so that the ratio of failure is increased, such as shrinkage spots, wrinkles, strains, folding or other defects, leading to serious problems of industrial production. From the viewpoint of stability in the industrial production, the films may preferably exhibit a change of heat shrinkability of only 10% or lower, more preferably only 4.3% or lower, in the main shrinkage direction of the film after treatment in hot water at 55–75° C. for 10 seconds before and after left under an atmosphere at 40° C. for 160 hours.

The heat-shrinkable polyester films of the present invention having a heat shrinkability of 40% or higher in the main shrinkage direction of the film after treatment in hot water at 80° C. for 10 seconds and exhibiting a change of heat shrinkability of only 15% or lower in the main shrinkage direction of the film after treatment in hot water at 55–75° C. for 10 seconds before and after left under an atmosphere at 40° C. for 160 hours are suitably used for applications such as full labels and cap seals, in particular, which require film labels to have high shrinkability depending on the shapes of vessels, and these films cause no lowering in shrinkability at low temperatures, even if stored for a long period of time, and they can therefore keep excellent shrinkage finish. In other words, these films can keep quality for a long period of time, even if stored not at low temperatures as in ordinary cases, but at higher temperatures, for example, at room temperature, and they can therefore extend a period of quality retention time. In addition, even after storage for a long period of time, these films can exhibit beautiful shrinkage finish involving only rare occurrence of shrinkage spots, wrinkles, strains, folding and other defects.

The present inventors have found that increased amounts of low Tg components in the components of polyesters constituting the films give too small values of tan δ for dynamic viscoelasticity at low temperatures, resulting in an upward tendency in spontaneous shrinkability. In other words, to have shrinkability on a fixed level or higher at low temperatures and exhibit beautiful shrinkage finish in appearance, before and after long-term storage, the heat-shrinkage polyester films of the present invention should have a heat shrinkability of 40% or higher in the main shrinkage direction of the film after treatment in hot water at 80° C. for 10 seconds and may preferably have an intersection temperature of 70° C. or lower for the values of tan δ for dynamic viscoelasticity before and after under an atmosphere at 40° C. for 160 hours. Now an explanation is given of the intersection temperature for the values of tan δ for dynamic viscoelasticity. Comparing the values of tan δ before and after the film is left under an atmosphere at 40° C. for 160 hours, the film after leaving exhibits lowering in the values of tan δ with a decrease in loss modulus over a temperature range of from a certain temperature taken as a boundary temperature to about 0° C. at the lowest, with the boundary temperature being close to the glass transition temperature of a polymer(s) constituting the film. The boundary temperature was defined as the intersection temperature for the values of tan δ and used as an index measuring a change in the physical properties of films after a lapse of long time.

The polyester resins used in the heat-shrinkable polyester films of the present invention are composed mainly of aromatic dicarboxylic acids or their ester formed derivatives, or aliphatic dicarboxylic acids as dicarboxylic acid components, and polyhydric alcohol components. The aromatic dicarboxylic acids may include, for example, terephthalic acid, isophthalic acid, naphthalene-1,4- or -2,6-dicarboxylic acid and 5-sodiumsulfoisophthalic acid. Their ester derivatives may include derivatives such as dialkyl esters and diaryl esters. The aliphatic dicarboxylic acids may include dimer acid, glutaric acid, adipic acid, sebacic acid, azelaic acid, oxalic acid and succinic acid. There may also be used in combination, if necessary, oxycarboxylic acids such as p-oxybenzoic acid, or polycarboxylic acids such as trimellitic anhydride or pyromellitic anhydride.

The polyhydric alcohol components of the polyester resins used in the heat-shrinkable polyester films of the present invention may include alkylene glycols such as ethylene glycol, diethylene glycol, dimer diol, propylene glycol, triethylene glycol, 1,4-butanediol, neopentyl glycol, 1,3-cyclohexanedimethanol, 1,4-cyclohexanedimethanol, 1,6-hexanediol, 3-methyl-1,5-pentanediol, 2-methyl-1,5-pentanediol, 2,2-diethyl-1,3-propanediol, 1,9-nonanediol and 1,10-decanediol; ethylene oxide adducts of bisphenol compounds or their derivatives; trimethylol propane, glycerin, pentaerythritol, polyoxytetramethylene glycol and polyethylene glycol. Although it is not a polyhydric alcohol, ε-caprolactone may also be included.

Preferred polyesters contain as a constitute component at least one of dimer acid as the dicarboxylic acid component or dimer diol as the polyhydric alcohol component, among the above dicarboxylic acid components and polyhydric alcohol components, or ε-caprolactone in place of a polyhydric alcohol. The incorporation of dimer acid and/or dimer diol and/or ε-caprolactone as a constituent component(s) in the polyesters has an effect on the prevention of a lowering in low-temperature shrinkability after a lapse of time. This also makes possible the raise of shrinkability at low temperatures, while keeping the break resistance of films, leading to easy control of film characteristics. The dimer acid and/or dimer diol are mixtures composed mainly of components with the structures of the following chemical formulas (1) and (2), their preferred constitution ratio being (1):(2)=10:90 to 90:10. The dimer acid and/or dimer diol have preferably been purified by washing with water.

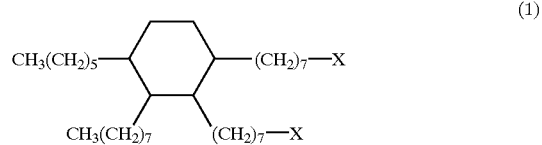

wherein X is —COOH or —CH$_2$OH.

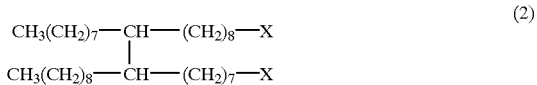

wherein X is —COOH or —CH$_2$OH.

In the heat-shrinkability polyester films of the present invention, the incorporation of the above constituent components makes a further improvement in shrinkage finish over a wide range of low to high temperatures, a reduction in the change of shrinkability over a range of low temperatures, particularly after a lapse of long time, and an improvement in break resistance.

The heat shrinkability in the main shrinkage direction of the film after treatment in hot water at 80° C. for 10 seconds, the change of heat shrinkability in the main shrinkage direction of the film after treatment in hot water at 55–75° C. for 10 seconds before and after the film is left under an atmosphere at 40° C. for 160 hours, the ratio of initial break in a direction perpendicular to the main shrinkage direction of the film, and the spontaneous shrinkability can be controlled within the claimed ranges by combining the use of the above polyester resin constituent components and the conditions of film formation.

The above polyesters may be used alone, or two or more of the polyesters may be used in admixture. When two or more of the polyesters are used in combination, they may be mixed systems of polyethylene terephthalate and copolyesters, or combinations of copolyesters, or combinations of copolyesters and homopolyesters such as polybutylene terephthalate, polycyclohexylene dimethylterephthalate or polyethylene naphthalate. Mixing of two or more of the polyesters with different glass transition temperatures (Tg) can also be useful means to attain the purpose of the present invention. The polyesters preferably have ethylene terephthalate units at 10–90 mol %, more preferably 15–85 mol %, in all the units. When ethylene terephthalate units are contained in amounts smaller than 10 mol %, the resulting films become deteriorated in their break resistance and solvent resistance. When ethylene terephthalate units are contained in amounts greater than 90 mol %, the resulting films have lowered heat shrinkability making it impossible to obtain satisfactory shrinkage performance. The polyesters can be produced by melt polymerization according to the ordinary methods; however, they are not limited to those obtained in this manner, but may also be those obtained by any other method of polymerization. The degree of polymerization in the polyesters is preferably 0.3–1.3 in terms of intrinsic viscosity.

To the polyesters, there can also be added for the purpose of preventing coloration and gel formation to improve heat resistance, besides polymerization catalysts such as antimony oxide, germanium oxide or titanium compounds, Mg salts such as magnesium acetate and magnesium chloride, Ca salts such as calcium acetate and calcium chloride, Mn salts such as manganese acetate and manganese chloride, Zn salts such as zinc chloride and zinc acetate, or Co salts such as cobalt chloride and cobalt acetate, in an amount of 300 ppm or smaller as each metal ion, relative to the polyester produced; or phosphoric acid or phosphoric acid ester derivatives such as phosphoric acid trimethyl ester and phosphoric acid triethyl ester in an amount of 200 ppm or smaller in terms of phosphorus (P).

When the total amount of metal ions other than the above polymerization catalysts is greater than 300 ppm, relative to the polyester produced, or when the amount of phosphorus (P) is greater than 200 ppm, the resulting polymers cause remarkable coloration and have remarkably lowered heat resistance and hydrolysis resistance.

In this case, the molar atomic ratio (P/M) of the total amount of phosphorus (P) to the total amount of metal ions (M) is preferably 0.4–1.0 from the viewpoint of heat resistance and hydrolysis resistance. When the molar atomic ratio (P/M) is lower than 0.4 or higher than 1.0, the resulting polymers cause remarkable coloration or formation of coarse particles, which is not preferred.

The method for producing the polyesters is not particularly limited, but may include what is known as the direct polymerization method in which dicarboxylic acids and glycols are directly reacted and the resulting oligomers are allowed to cause polycondensation and what is known as the transesterification method in which dimethyl esters of dicarboxylic acids and glycols are allowed to cause transesterification reaction, followed by polycondensation. Any of the production methods can be applied.

The timing for adding the above metal ions and phosphoric acid and its derivatives is not particularly limited, but in general, the metal ions are preferably added during the charge of base materials, ie., before transesterification or esterification, whereas the phosphoric acid and its derivatives are preferably added before polycondensation reaction.

To the polyesters, there may also be added, if necessary, fine particles such as silica, titanium dioxide, kaolin and calcium carbonate, and there can further be added antioxidants, ultraviolet light absorbers, antistatic agents, colorants, antimicrobial agents and other additives. The preferred intrinsic viscosity of the polyesters for film formation is not limited, but usually 0.40–1.30 dl/g.

The polyester base materials used in the present invention are dried using a dryer such as hopper dryer or paddle dryer, or a vacuum dryer, and extruded into a film shape at 200–300° C. Alternatively, undried polyester base materials are extruded into a film shape in the same manner, while removing water content in an extruder of the vent type. In the extrusion, any of the existing methods can be employed, such as T-die method or tubular method. After extrusion, rapid cooling gives an unstretched film, and stretching treatment is carried out for this unstretched film. To attain the purpose of the present invention, the transverse direction is practical as the main shrinkage direction. Therefore, the following will describe an example of the film formation method when the transverse direction is taken as the main shrinkage direction; however, film formation can also be carried out in the same manner, even when the machine direction is taken as the main shrinkage direction, in accordance with the ordinary procedures, except that the direction of stretching in the following method is turned 90 degrees.

From the viewpoint of attaining even thickness distribution of heat-shrinkable polyester films of interest, in the step of pre-heating carried out prior to the step of stretching, when the films are stretched in the transverse direction with a tenter, heating is preferably carried out at a low air flow rate with a heat transmission coefficient of 0.0013 cal/cm$^2$·sec·° C. (in SI units, 0.0054 J/cm$^2$·sec·K) or lower until the film temperature comes to Tg+0° C. to Tg+60° C. For stretching in the transverse direction, the films are stretched at a ratio of 2.3–7.3, preferably 2.5–6.0, at a temperature of Tg −20° C. to Tg −30° C. Subsequently, the films are heat treated at 50–110° C. under 0–15% elongation or 0–15% relaxation, and if necessary, further heat treated at 40–100° C., to give heat-shrinkable polyester films.

The method of stretching may include transverse uniaxial stretching with a tenter, and the films can further be stretched in the machine direction at a ratio of 1.0–2.3, preferably 1.1–1.8; however, when the films are stretched at a ratio of higher than 2.3, heat shrinkability becomes higher and exceeds 15% in a direction perpendicular to the main shrinkage direction of the film after treatment in hot water at 80° C. for 10 seconds, which is not preferred for the present invention. Such biaxial stretching may be either successive biaxial stretching or simultaneous biaxial stretching, and if necessary, the films may further be stretched. In the successive biaxial stretching, the order of stretching may be in any manner, including in the machine direction and then in the transverse direction; in the transverse direction and then in the machine direction; in the machine direction, in the transverse direction and then in the machine direction; in the transverse direction, in the machine direction and then in the transverse direction. From the viewpoint of prevention of the heat generation in the films accompanying stretching to reduce irregularity of the film temperature in the widthwise direction, the heat transmission coefficient in the step of stretching is suitably conditioned to 0.0009 cal/cm$^2$·sec·° C. (in SI units, 0.0038 J/cm$^2$ ·sec·K) or higher, preferably 0.0013–0.0020 cal/cm$^2$ ·sec·° C. (in SI units, 0.0054–0.0084 J/cm$^2$ ·sec·K). As explained above, the purpose of the present invention can be achieved by a combination of the polyester composition of film base materials and the method of stretching.

In the present invention, the ratio of initial break in a perpendicular direction to the main shrinkage direction of the film is preferably 5% or lower and more preferably 0%. When the ratio of initial break is higher than 5%, the resulting films become deteriorated in their break resistance. In the heat-shrinkable polyester films, their molecules have been oriented in the main shrinkage direction; therefore, if the films become deteriorated in their break resistance, serious problems arise that they become easily tearable along the direction of molecular orientation to cause a break of the films by tension in the printing, tubing or other steps of processing, resulting in a decrease in processing workability.

The heat-shrinkable polyester films of the present invention having a ratio of initial break of 5% or lower in a perpendicular to the main shrinkage direction of the film have excellent break resistance, so that a loss by a break of the films in the step of printing or tubing can be reduced and they can be processed at a high speed.

Further, in the present invention, the spontaneous shrinkability in the main shrinkage direction of the film after the film is left under an atmosphere at 40° C., close to the storage temperature, for 160 hours should preferably be 4% or lower. When the spontaneous shrinkability is higher than 4%, the resulting films have deteriorated in their dimensional stability at ordinary temperatures, so that they cause film sagging or fastened winding, deviation of thickness, and other defects during the long-term storage in a rolled form.

The heat-shrinkable polyester films of the present invention having a spontaneous shrinkability of 5% or lower in the main shrinkage direction of the film after left under an atmosphere at 40° C. for 160 hours have excellent dimensional stability, so that they cause, even if stored for a period of long time in a rolled form, neither film sagging, nor fastened winding, nor deviation of thickness, nor other defects by spontaneous shrinkage of heat-shrinkable films. In other words, these films can keep good rolled-film form for a long period of time, even if stored not at low temperatures as in ordinary cases, but at higher temperatures, for example, at ordinary temperatures, and they can therefore further extend a period of storage.

For the heat-shrinkable polyester films of the present invention, the thickness thereof is not particularly limited, but is preferably 10–200 μm, more preferably 20–100 μm, for example, as shrinkable films for labels.

EXAMPLES

The present invention will hereinafter be further illustrated by some examples and comparative examples; however, the present invention is not limited to these examples.

The heat-shrinkable polyester films of the present invention were evaluated by the following methods.

(1) Heat Shrinkability

A film was cut into a square shape of 10 cm×10 cm with two sides parallel to the machine direction and to the transverse direction, respectively. This sample was heat shrunk by immersion under no load in hot water at 80±0.5° C. for 10 seconds and then measured for side lengths in the machine direction and in the transverse direction, respectively. The heat shrinkability was calculated from the measured values of side lengths by the following equation. The direction of either side corresponding to the larger value of heat shrinkability was referred to as the main shrinkage direction. The measurement was repeated for five samples of each film (n=5).

$$\text{Heat shrinkability} = \frac{\text{Side length before shrinkage} - \text{Side length after shrinkage}}{\text{Side length before shrinkage}} \times 100(\%)$$

(2) Change of Heat Shrinkability

A film cut in the same size as described above in (1) was left for aging in a thermostatic/humidistatic chamber controlled at a temperature of 40±1° C. under a relative humidity of 30±2% for 160 hours, and then taken out. The heat shrinkability was measured at temperatures of 55° C., 60° C., 65° C., 70° C. and 75° C. for the sample before and after aging in the same manner as described above in (1). A difference between the values of heat shrinkability at each measuring temperature before and after aging was calculated, and the maximum value of such a difference is regarded as the change of heat shrinkability. The measurement was repeated for five samples of each film (n=5).

(3) Dynamic Viscoelasticity

A film was cut into a strip of 4 cm in length along the main shrinkage direction and 5 mm in width along the direction perpendicular thereto, and the measurement of dynamic viscoelasticity was carried out with this sample using a dynamic viscoelasticity measuring apparatus available from ITK Co., Ltd. under the conditions that measurement length was 3 cm, displacement was 0.25%, and frequency was 10 Hz, thus determining the value of tan δ at intervals of 1° C. over a temperature range of 0–150° C. The value of tan δ was reported as an average of those obtained from two samples of each film. The intersection temperature for the values of tan δ was determined as follows. The film was left for aging in a thermostatic/humidistatic chamber controlled at 40±1° C. under a relative humidity of 30±2% for 160 hours, and then taken out for the measurement of dynamic viscoelasticity in the same manner as described above. The values of tan δ before and after aging were plotted on the same graph, and the critical temperature at which the value of tan δ is beginning to cause lowering with a decrease in loss modulus over a temperature range of from a certain temperature to about 0° C. at the lowest was defined as the intersection temperature. FIG. 1 shows how to determine the intersection temperature for the values of tan δ.

(4) Ratio of Initial Break

A film was cut into a strip of 15 mm in width along the main shrinkage direction and 100 mm in length along the direction perpendicular thereto, and this sample was measured for elongation at break in the main shrinkage direction and in the direction perpendicular thereto according to JIS-C-2318. The measurement was repeated for twenty samples of each film (n=20), and the number (x) of samples exhibiting 5% or smaller elongation at break was determined. The rate of initial break was calculated from the values of x and n by the following equation:

$$\text{Rate of initial break} = (x/n) \times 100(\%)$$

(5) Spontaneous Shrinkability

A film was cut in a rectangular shape of 40 cm×2 cm along the main shrinkage direction and along the direction perpendicular thereto, respectively. This sample was left for aging in a thermostatic/humidistatic chamber controlled at a temperature of 40±1° C. under a relative humidity of 30±2% for 160 hours, and then taken out for the measurement of side length in the main shrinkage direction. The spontaneous shrinkability in the main shrinkage direction was calculated from the measured values of side lengths by the following equation. The measurement was repeated for five samples of each film (n=5).

Spontaneous shrinkability =

$$\frac{\text{Side length before aging} - \text{Side length after aging}}{\text{Side length before aging}} \times 100 (\%)$$

(6) Shrinkage Finish

A film was printed with three inks of glass, gold and white colors, and cut into a rectangular shape of 225 mm in width along the main shrinkage direction and 110 mm in height along the direction perpendicular thereto. This sample was formed into a cylindrical label of 110 mm in height and 110 mm in folding diameter (i e., length in the width direction when the label was folded flat) by attaching one end to the other in the main shrinkage direction (the width of margins for attachment was 5 mm) with 1,3-dioxolane. The label was fitted on a glass bottle (300 ml) and heat shrunk by allowing the labeled glass bottle to pass through a heat shrinkage tunnel of the hot air type with hot air at 150° C. (air flow rate, 10 m/sec) for a passage time of 10 seconds. The shrinkage finish was determined by visual observation and evaluated at 5 ranks on the following criteria.

rank 5: best finish rank 4: good finish rank 3: a few (2 or less) shrinkage spots were found rank 2: some (3–5) shrinkage spots were found rank 1: many (6 or more) shrinkage spots were found in which ranks 3, 4 and 5 were regarded as acceptable.

Synthesis of Polyesters

In a stainless steel autoclave equipped with a stirrer, a thermometer, and a condenser of the partial reflux type were placed starting materials at a composition of 100 mol % dimethyl terephthalate (DMT) as a dibasic acid component and 73 mol % ethylene glycol (EG) and 27 mol % neopentyl glycol (NPG) as glycol components so that the glycols were 2.2 times as high in molar ratio as the methyl ester. This was followed by addition of 0.05 mol % (relative to the acid component) zinc acetate as a transesterification catalyst and 0.025 mol % (relative to the acid component) antimony trioxide as a polycondensation catalyst, and while removing formed methanol by distillation from the system, transesterification was carried out. After that, polycondensation was carried out at 280° C. under a reduced pressure of 0.2 Torr to give polyester A having an intrinsic viscosity of 0.66 dl/g.

In the same manner as described above, polyesters shown in Table 1 were produced, in which case dimethyl naphthalate (DMN), c-caprolactone (εCL), butanediol (BD), dimer acid (DIA) (PREPOL available from Unichema), and dimer diol (DIDO) (HP-1000 available from Toagosei Co., Ltd.) were used. These polyesters had an intrinsic viscosity of (B): 0.69 dl/g; (C): 1.25 dl/g; (D): 0.60 dl/g; (E): 0.63 dl/g; (G): 0.70 dl/g; and (H): 0.65 dl/g, and polyester F had a reduced viscosity of 1.30.

Reduced viscosity: 0.05 g of the polymer was dissolved in 25 ml of a mixed solvent (phenol/tetrachloroethane=60/40), and measured for reduced viscosity at 25° C. with an Ostwald's viscometer.

TABLE 1

| Poly-ester | Dicarboxylic acid components (mol %) | | | Ester component (mol %) | Diol components (mol %) | | | |
|---|---|---|---|---|---|---|---|---|
| | DMT | DMN | DIA | εCL | EG | BD | NPG | DIDO |
| A | 100 | — | — | — | 73 | — | 27 | — |
| A' | 100 | — | — | — | 71 | — | 29 | — |
| B | 100 | — | — | — | 100 | — | — | — |
| C | 100 | — | — | — | — | 100 | — | — |
| D | 30 | 70 | — | — | 90 | — | — | 10 |
| D' | 30 | 70 | — | — | 84 | — | — | 16 |
| E | 8 | 92 | — | — | 100 | — | — | — |
| F | 80 | — | — | 20 | — | 80 | — | — |
| G | 85 | 15 | — | — | 91 | — | — | 9 |
| G' | 85 | 15 | — | — | 92 | — | — | 8 |
| H | 96 | — | 4 | — | 84 | — | 16 | — |

Example 1

Polyesters A, B and F shown in Table 1 were mixed in a resin state at 48, 32 and 20 wt %, respectively, melt extruded at 280° C., followed by rapid cooling, to give an unstretched film of 180 μm in thickness. The unstretched film was pre-heated at 100° C. for 10 seconds, stretched in the transverse direction at ratios of 1.3 at 85° C., 1.5 at 80° C. and 2.0 at 75° C., cooled to 60° C. and then heat treated at 70° C. under 3% elongation for 10 seconds to give a heat-shrinkable polyester film of 45 μm in thickness. The physical properties of the resulting film are shown in Table 2. The heat transfer coefficients in the pre-heating step and the stretching step were 0.0048 J/cm$^2$·sec·K and 0.0063 J/cm2·sec·K, respectively. The same heat transfer coefficients were employed in the following Examples and Comparative Examples.

Example 2

Polyesters G and B shown in Table 1 were mixed in a resin state at 95 and 5 wt %, respectively, melt extruded at 280° C., followed by rapid cooling, to give an unstretched film of 180 μm in thickness. The unstretched film was pre-heated at 100° C. for 10 seconds, stretched in the transverse direction at ratios of 1.3 at 85° C., 1.5 at 80° C. and 2.0 at 75° C., cooled to 60° C., and then heat treated at 70° C. under 3% elongation for 10 seconds to give a heat-shrinkable polyester film of 45 μm in thickness. The physical properties of the resulting film are shown in Table 2.

Example 3

Polyester H shown in Table 1 was melt extruded at 280° C., followed by rapid cooling, to give an unstretched film of 180 μm in thickness. The stretched film was pre-heated at 100° C. for 10 seconds, stretched in the transverse direction at ratios of 1.3 at 85° C., 1.5 at 80° C. and 2.0 at 75° C., cooled to 60° C., and then heat treated at 70° C. under 3% elongation for 10 seconds to give a heat-shrinkable polyester film of 45 μm in thickness. The physical properties of the resulting film are shown in Table 2.

Example 4

Polyester D shown in Table 1 was melt extruded at 275° C., followed by rapid cooling, to give an unstretched film of 185 μm in thickness. The stretched film was pre-heated at 105° C. for 8 seconds, stretched in the transverse direction at a ratio of 4.1 at 78° C., and then heat treated at 65° C. under fixation for 10 seconds to give a heat-shrinkable polyester film of 45 μm in thickness. The physical properties of the resulting film are shown in Table 2.

Comparative Example 1

Polyesters A, B and C shown in Table 1 were mixed in a resin state at 63, 10 and 27 wt %, respectively, melt extruded at 275° C., followed by rapid cooling, to give an unstretched film of 190 μm in thickness. The unstretched film was pre-heated at 110° C. for 10 seconds, stretched in the transverse direction at a ratio of 4.2 at 77° C., and then heat treated at 72° C. under fixation for 10 seconds to give a heat-shrinkable polyester film of 45 μm in thickness. The physical properties of the resulting film are shown in Table 2.

Comparative Example 2

Polyesters A, B and C shown in Table 1 were mixed in a resin state at 55, 20 and 25 wt %, respectively, melt extruded at 275° C., followed by rapid cooling, to give an unstretched film of 190 μm in thickness. The unstretched film was pre-heated at 100° C. for 8 seconds, stretched in the transverse direction at a ratio of 3.9 at 80° C., and then heat treated at 72° C. under fixation for 10 seconds to give a heat-shrinkable polyester film of 45 μm in thickness. The physical properties of the resulting film are shown in Table 2.

Comparative Example 3

Polyesters A, B and C shown in Table 1 were mixed in a resin state at 50, 30 and 10 wt %, respectively, melt extruded at 275° C., followed by rapid cooling, to give an unstretched film of 175 μm in thickness. The unstretched film was pre-heated at 100° C. for 8 seconds, stretched in the transverse direction at a ratio of 3.9 at 80° C., and then heat treated at 83° C. under fixation for 10 seconds to give a heat-shrinkable polyester film of 45 μm in thickness. The physical properties of the resulting film are shown in Table 2.

Comparative Example 4

Polyesters A, B, C and E shown in Table 1 were mixed in a resin state at 32, 50, 10 and 8 wt %, respectively, melt extruded at 280° C., followed by rapid cooling, to give an unstretched film of 180 μm in thickness. The unstretched film was pre-heated at 110° C. for 8 seconds, stretched in the transverse direction at a ratio of 4.0 at 85° C., and then heat treated at 75° C. for 10 seconds to give a heat-shrinkable polyester film of 45 μm in thickness. The physical properties of the resulting film are shown in Table 2.

Example 5

Polyesters A', B and F shown in Table 1 were mixed in a resin state at 48, 32 and 20 wt %, respectively, melt extruded at 280° C., followed by rapid cooling, to give an unstretched film of 180 μm in thickness. The unstretched film was pre-heated at 100° C. for 10 seconds, stretched in the transverse direction at ratios of 1.3 at 85° C., 1.5 at 80° C. and 2.0 at 75° C., cooled to 60° C., and then heat treated at 70° C. under 3% elongation for 10 seconds to give a heat-shrinkable polyester film of 45 μm in thickness. The physical properties of the resulting film are shown in Table 2.

Example 6

Polyesters G' and B shown in Table 1 were mixed in a resin state at 95 and 5 wt %, respectively, melt extruded at 280° C., followed by rapid cooling, to give an unstretched film of 180 μm in thickness. The unstretched film was pre-heated at 100° C. for 10 seconds, stretched in the transverse direction at ratios of 1.3 at 85° C., 1.5 at 80° C. and 2.0 at 75° C., cooled to 60° C., an heat treated at 70° C. under 3% elongation for 10 seconds to give a heat-shrinkable polyester film of 45 μm in thickness. The physical properties of the resulting film are shown in Table 2.

Example 7

Polyester D' shown in Table 1 was melt extruded at 275° C., followed by rapid cooling, to give an unstretched film of 185 μm in thickness. The stretched film was pre-heated at 105° C. for 8 seconds, stretched in the transverse direction at a ratio of 4.1 at 78° C., and then heat treated at 65° C. under fixation for 10 seconds to give a heat-shrinkable polyester film of 45 μm in thickness. The physical properties of the resulting film are shown in Table 2.

Comparative Example 5

Polyesters A', B and C shown in Table 1 were mixed in a resin state at 63, 10 and 27 wt %, respectively, melt extruded at 275° C., followed by rapid cooling, to give an unstretched film of 190 μm in thickness. The unstretched film was pre-heated at 110° C. for 10 seconds, stretched in the transverse direction at a ratio of 4.2 at 77° C., and then heat treated at 72° C. under fixation for 10 seconds to give a heat-shrinkable polyester film of 45 μm in thickness. The physical properties of the resulting film are shown in Table 2.

Comparative Example 6

Polyesters A', B and C shown in Table 1 were mixed in a resin state at 55, 20 and 25 wt %, respectively, melt extruded at 275° C., followed by rapid cooling, to give an unstretched film of 190 μm in thickness. The unstretched film was pre-heated at 100° C. for 8 seconds, stretched in the transverse direction at a ratio of 3.9 at 80° C., and then heat treated at 72° C. under fixation for 10 seconds to give a heat-shrinkable polyester film of 45 μm in thickness. The physical properties of the resulting film are shown in Table 2.

Comparative Example 7

Polyesters A', B and C shown in Table 1 were mixed in a resin state at 50, 30 and 10 wt %, respectively, melt extruded at 275° C., followed by rapid cooling, to give an unstretched film of 175 μm in thickness. The unstretched film was pre-heated at 100° C. for 8 seconds, stretched in the transverse direction at a ratio of 3.9 at 80° C., and then heat treated at 83° C. under fixation for 10 seconds to give a heat-shrinkable polyester film of 45 μm in thickness. The physical properties of the resulting film are shown in Table 2.

Comparative Example 8

Polyesters A', B, C and E shown in Table 1 were mixed in a resin state at 32, 50, 10 and 8 wt %, respectively, melt extruded at 280° C., followed by rapid cooling, to give an unstretched film of 180 μm in thickness. The unstretched film was pre-heated at 110° C. for 8 seconds, stretched in the transverse direction at a ratio of 4.0 at 85° C., and then heat treated at 75° C. for 10 seconds to give a heat-shrinkable polyester film of 45 μm in thickness. The physical properties of the resulting film are shown in Table 2.

TABLE 2

| | Heat shrinkability at 80° C. (%) | Change of heat shrinkability (%) | Maximum value of tan δ | | Intersection temperature for values of tan δ (° C.) | Ratio of initial break (%) | Spontaneous shrinkability (%) | Shrinkage finish with hot air | |
|---|---|---|---|---|---|---|---|---|---|
| | | | 0–40° C. | 40–120° C. | | | | before aging | after aging |
| Example 1 | 65 | 12 (65° C.) | 0.02 | 0.99 | 63 | 0 | 1.4 | 5 | 5 |
| Example 2 | 59 | 13 (65° C.) | 0.03 | 0.96 | 62 | 0 | 1.9 | 5 | 5 |
| Example 3 | 58 | 11 (70° C.) | 0.02 | 1.03 | 63 | 0 | 1.1 | 5 | 5 |
| Example 4 | 63 | 13 (70° C.) | 0.05 | 0.99 | 72 | 0 | 4.5 | 3 | 3 |
| Example 5 | 65 | 13 (65° C.) | 0.01 | 0.98 | 63 | 0 | 0.75 | 5 | 5 |
| Example 6 | 59 | 12 (65° C.) | 0.02 | 0.95 | 62 | 0 | 1.07 | 5 | 5 |
| Example 7 | 63 | 13 (70° C.) | 0.05 | 1.00 | 68 | 0 | 4.30 | 3 | 3 |
| Comp. Ex. 1 | 71 | 30 (70° C.) | 0.02 | 1.09 | 71 | 0 | 0.8 | 4 | 2 |
| Comp. Ex. 2 | 69 | 19 (70° C.) | 0.02 | 1.02 | 71 | 30 | 0.7 | 4 | 2 |
| Comp. Ex. 3 | 38 | 12 (70° C.) | 0.02 | 0.80 | 73 | 10 | 0.5 | 1 | 1 |
| Comp. Ex. 4 | 48 | 19 (70° C.) | 0.02 | 0.89 | 73 | 0 | 1.0 | 2 | 2 |
| Comp. Ex. 5 | 71 | 28 (70° C.) | 0.01 | 1.08 | 71 | 0 | 0.59 | 4 | 2 |
| Comp. Ex. 6 | 69 | 20 (70° C.) | 0.01 | 1.00 | 71 | 30 | 0.53 | 4 | 2 |
| Comp. Ex. 7 | 38 | 13 (70° C.) | 0.01 | 0.78 | 73 | 10 | 0.32 | 1 | 1 |
| Comp. Ex. 8 | 48 | 19 (70° C.) | 0.01 | 0.88 | 73 | 0 | 0.34 | 2 | 2 |

The heat-shrinkable polyester films of the present invention exhibit beautiful shrinkage finish in appearance involving only rare occurrence of shrinkage spots, wrinkles, strains, folding and other defects during shrinkage in the step of shrinking with hot air, and in particular, exhibit a quite small lowering in shrinkage finish after a lapse of time for storage and have low spontaneous shrinkability; therefore, these films are suitably used for applications such as labels and cap seals.

What is claimed is:

1. A heat-shrinkable polyester film having a heat shrinkability of 40% or higher in the main shrinkage direction of the film after treatment in hot water at 80° C. for 10 seconds, the change of heat shrinkability in the main shrinkage direction of the film after treatment in hot water at 55–75° C. for 10 seconds before and after the film is left under an atmosphere at 40° C. for 160 hours being 15% or lower.

2. A heat-shrinkable polyester film according to claim 1, wherein the maximum value of tan δ for dynamic viscoelasticity in the main shrinkage direction of the film over a temperature range of 40–120° C. is 0.5 or higher and the intersection temperature for the values of tan δ for dynamic viscoelasticity in the main shrinkage direction of the film before and after the film is left under an atmosphere at 40° C. for 160 hours is 70° C. or lower.

3. A heat-shrinkable polyester film according to claim 1, wherein the spontaneous shrinkability in the main shrinkage direction of the film after the film is left under an atmosphere at 40° C. for 160 hours is 5% or lower.

4. A heat-shrinkable polyester film according to claim 1, wherein the ratio of initial break in a direction perpendicular to the main shrinkage direction is 5% or lower.

5. A heat-shrinkable polyester film according to claim 4, wherein the polyester contains at least one selected from dimer acid, dimer diol and ε-caprolactone as a constituent monomer component.

* * * * *